(12) United States Patent
Raschke

(10) Patent No.: US 7,388,613 B2
(45) Date of Patent: Jun. 17, 2008

(54) POP UP PRISM LENS ASSEMBLY

(75) Inventor: Klaus G. Raschke, Weston, FL (US)

(73) Assignee: Flextronics International USA, Inc., Milpitas, CA (US)

( * ) Notice: Subject to any disclaimer, the term of this patent is extended or adjusted under 35 U.S.C. 154(b) by 284 days.

(21) Appl. No.: 10/884,869

(22) Filed: Jul. 2, 2004

(65) Prior Publication Data

US 2006/0001759 A1 Jan. 5, 2006

(51) Int. Cl.
*H04N 5/225* (2006.01)

(52) U.S. Cl. .................. 348/335; 348/373

(58) Field of Classification Search .......... 348/357, 348/337; 396/478, 384
See application file for complete search history.

(56) References Cited

U.S. PATENT DOCUMENTS

| | | | |
|---|---|---|---|
| 3,656,422 A | 4/1972 | Hess et al. ........... 95/45 |
| 5,296,970 A | 3/1994 | Morizumi ............ 359/700 |
| 5,634,147 A | 5/1997 | Machida ............. 396/84 |
| 5,678,093 A * | 10/1997 | Asakura et al. ....... 396/379 |
| 5,937,215 A * | 8/1999 | Mogamiya ........... 396/85 |
| 6,252,628 B1 * | 6/2001 | Kobayashi ........... 348/240.3 |
| 6,292,634 B1 * | 9/2001 | Inaba ................ 396/326 |
| 6,339,508 B1 * | 1/2002 | Nozawa et al. ........ 359/686 |
| 6,498,903 B2 * | 12/2002 | Omiya ............... 396/379 |
| 6,670,989 B2 | 12/2003 | Kawanishi et al. ..... 348/240.99 |
| 2002/0067426 A1 * | 6/2002 | Nagata et al. ........ 348/373 |

* cited by examiner

*Primary Examiner*—David Ometz
*Assistant Examiner*—Luong T. Nguyen
(74) *Attorney, Agent, or Firm*—Henneman & Associates, PLC; Larry E. Henneman, Jr.

(57) ABSTRACT

A pop up prism camera (10) having a pop up prism lens assembly (11). A first lens assembly (14), a second lens assembly (18), and a prism assembly (21) are moved in relationship to a camera housing (12) controlled by a cam tube (20). The prism assembly (21) projects outside the camera housing (12) when the pop up prism camera (10) is in an operational configuration. A prism (100) of the prism assembly (21) redirects an optical path (48). A non-angled portion (44) of a first cam groove (30) causes the prism assembly (21) to remain fixed relative to the camera housing (12) while continued rotation of the cam tube (20) allows the first lens assembly (14) and the second lens assembly (18) to continue to move to accomplish a lens zoom function.

38 Claims, 4 Drawing Sheets

POP UP PRISM LENS ASSEMBLY

BACKGROUND OF THE INVENTION

1. Field of the Invention

The present invention relates generally to the field of camera devices and lens assemblies therefor, and more particularly to a novel concealable lens assembly for use primarily in digital cameras. The predominant current application for the inventive pop up prism lens assembly is in the production of high quality digital cameras, wherein small size, rugged construction and cost are all important factors.

2. Description of the Background Art

It is known in the art to use one or more prisms to redirect the optical path in a camera. Among other advantages, the use of a prism often allows the designer to make the camera package more compact than an entirely linear optical path would permit. Since positioning of the prism in relation to other lens components is critical in a high quality camera, it has been thought that the prism should be rigidly affixed within the camera housing. Also, it is believed that, prior to the present invention, there has been no apparent advantage in causing the prism to be movable within the camera housing.

It is also known in the prior art to provide a means to manually and/or automatically cover a camera lens when it is not in use. Usually, this means has included some sort of lens cap. Modern innovations in electronic cameras have included lenses which automatically retract when the camera is turned off, and this sort of arrangement is often accompanied by some sort of automatic closure mechanism which covers the opening into which the lens retracts.

It is also known in the prior art to use a drum type cam device to move lenses, as needed, within a camera. U.S. Pat. No. 6,670,989, issued to Kawanishi, et al., teaches an example of such a device.

It would be advantageous to have a method and or means to protect the lens of a camera, when it is not is use, which contributes to making the camera smaller and lighter, rather than requiring extra components and thereby making the camera larger, heavier, and more expensive to construct. It would also be advantageous to have a method and or means to protect the lens of a camera when it is not is use which provides a reliable relationship between surfaces of optical components in the lens system. It would also be advantageous to have a camera apparatus which would be simpler, more rugged, less expensive and/or optically superior to known prior art devices.

To the inventor's knowledge, no prior art device has successfully achieved the above described objectives. All prior art apparatus for retracting and/or protecting lens assemblies have negatively contributed to the size, weight and/or complexity of the camera, or else have not been as rugged and reliable as might be desired. All prior art apparatus for bringing camera optics into a "ready" position and/or for positioning a telephoto lens element have required relatively complex, large and expensive mechanisms, and a separate mechanism has been required to perform each of these functions.

SUMMARY

Accordingly, it is an object of the present invention to provide a camera lens apparatus which is well protected when the camera is not in use.

It is another object of the present invention to provide a camera lens apparatus which is quick and easy to bring into operational position from a stored position.

It is yet another object of the present invention to provide a camera lens apparatus which is quick and easy to put into a stored position from an operational position.

It is still another object of the present invention to provide a camera lens apparatus which is compact in size and light in weight.

It is yet another object of the present invention to provide a camera lens apparatus which is rugged and reliable in operation.

It is still another object of the present invention to provide a camera lens apparatus which is relatively inexpensive to manufacture.

It is yet another object of the present invention to provide a camera lens apparatus which provides a high degree of protection to optical components when the lens apparatus is in a stored position.

It is still another object of the present invention to provide a camera lens apparatus which provides a consistent and accurate associative relationship between the optical components thereof.

Briefly, an example of the present invention has an objective lens assembly which moves in and out of a camera by the rotation of a drum cam apparatus. Movement of the objective lens assembly is along a plurality of guide rods. At the distal end of the objective lens assembly a prism redirects the optical path. The prism is positioned such that, when the objective lens assembly and attached prism are withdrawn into the camera, the only surface of the prism which is exposed to the exterior is the one surface that is not in the optical path of the camera. Optionally, an additional cover can be affixed to the prism which occludes an opening into which the prism retracts. Movement of the optical lens components and the prism is controlled by the rotation of a drum type cam apparatus. Provision is made in the shape of cam grooves such that the prism can come into a full operational position and stay there even as the cam continues to rotate to provide a telescopic zoom function in the lens components. According to a described embodiment of the invention, the cam is generally comprised of two longitudinally divided portions, one of which serves to selectively bring the camera optics into a "ready" position and to return the optics to a stored position. The other cam portion serves to hold certain portions of the optics in the ready position while other certain portions are selectively moved to change the lens system magnification factor, as desired by the user.

These and other objects and advantages of the present invention will become clear to those skilled in the art in view of the description of modes of carrying out the invention, and the industrial applicability thereof, as described herein and as illustrated in the several figures of the drawing. The objects and advantages listed or discussed herein are not an exhaustive list of all possible objects or advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and/or advantages. Accordingly, the objects and advantages listed and/or discussed herein are not essential elements of the present invention, and should not be construed as limitations.

DETAILED DESCRIPTION OF THE INVENTION

Figure 1:
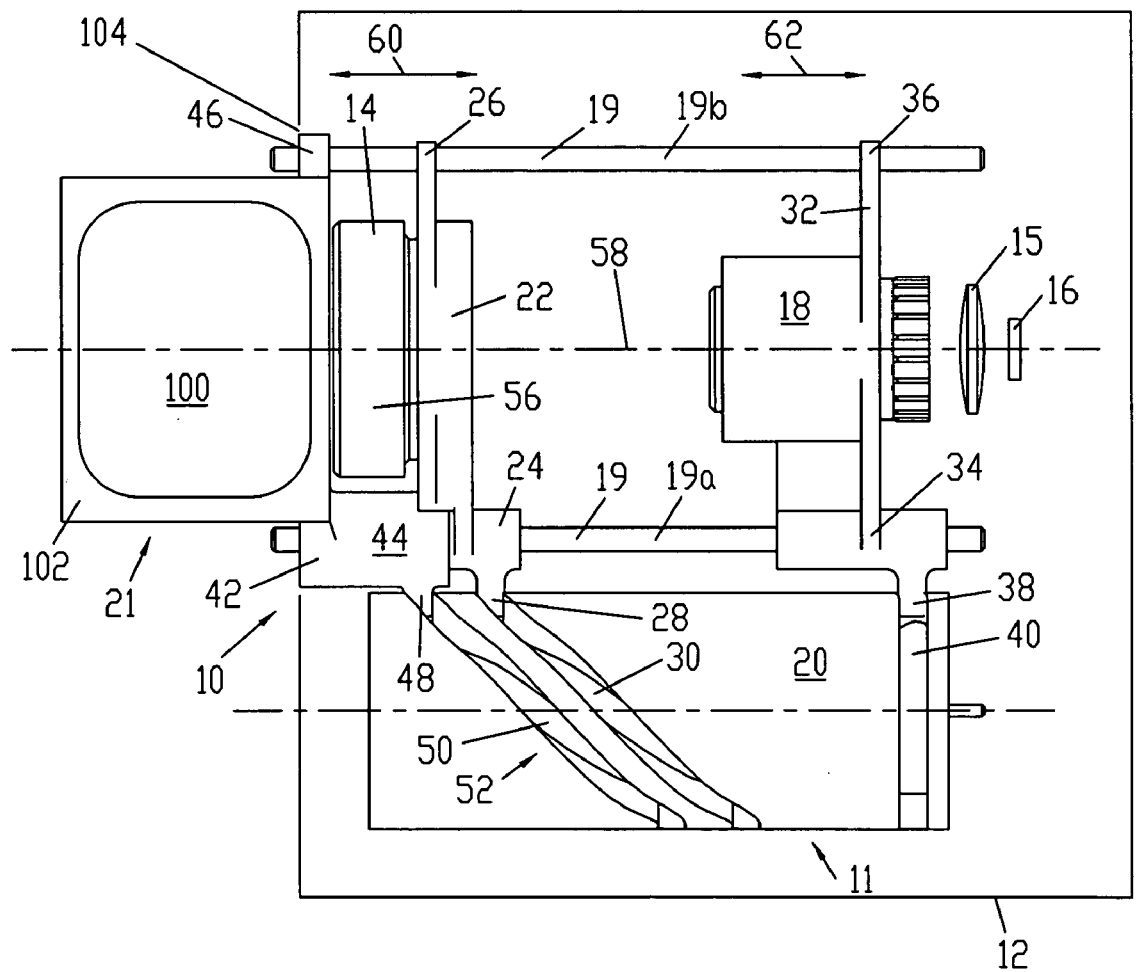
FIG. 1 is a diagrammatic cross-sectional side elevational view of a camera having an example of the inventive pop up prism lens assembly according to the present invention, showing the device in a opened position.

This invention is described in the following description with reference to the Figures, in which like numbers represent the same or similar elements. While this invention is described in terms of modes for achieving the objectives of this invention, it will be appreciated by those skilled in the art that variations may be accomplished in view of these teachings without deviating from the spirit or scope of the present invention. The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, because the range of potential applications is great, and because it is intended that the present invention be adaptable to many such variations.

Figure 2:
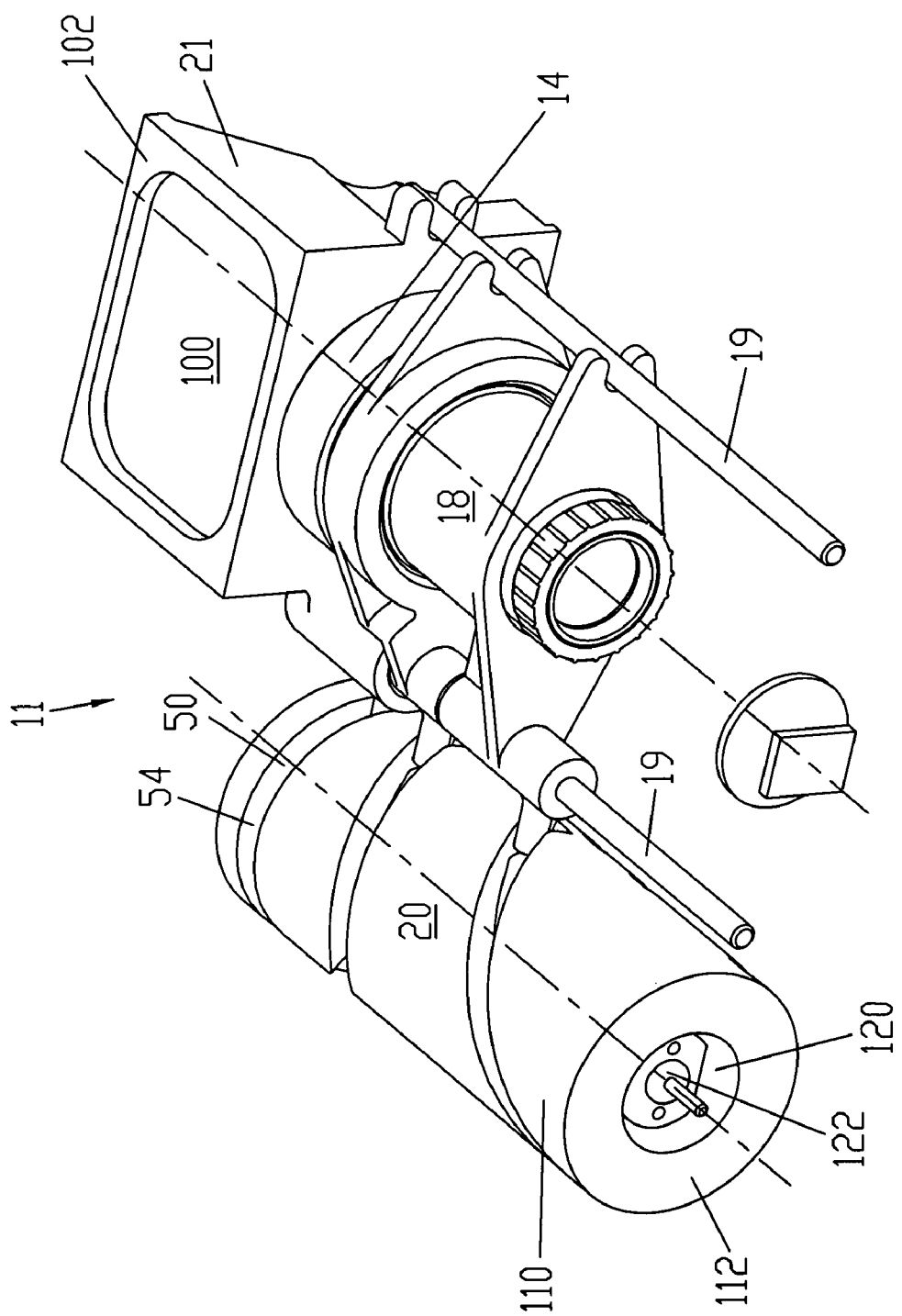
FIG. 2 is a diagrammatic perspective view of the pop up prism lens assembly of FIG. 1 showing the lens assembly in a ready position.
Figure 3:
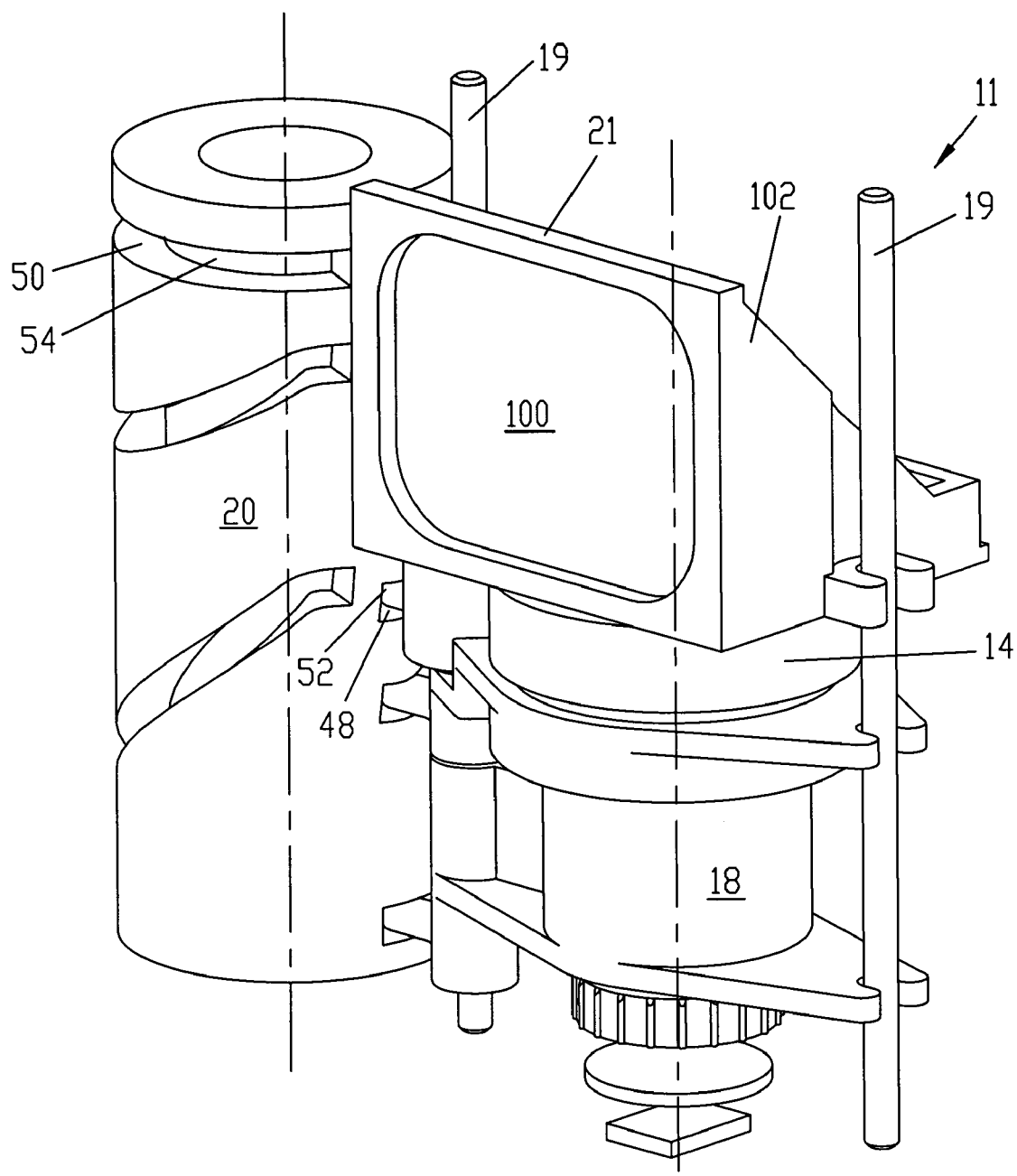
FIG. 3 is a diagrammatic perspective view of the pop up prism lens assembly of FIGS. 1 and and 2 showing the lens assembly in a closed position.

A known mode for carrying out the invention is a pop up prism camera. The inventive pop up prism camera 10 is depicted in a side elevational view in FIG. 1 and is designated therein by the general reference character 10. The pop up prism camera 10 includes an example of the inventive pop up prism lens assembly 11 in a camera housing 12. The camera housing 12 will contain additional components customary to the function of a camera, such as a view finder or electronic user display, operator control devices, and the like, all of which will be familiar to those skilled in the art. Except as specifically discussed herein, such additional components are not relevant to the present invention and will not be shown in the view of FIG. 1 for the sake of clarity. FIGS. 2 and 3 are different perspective views of the pop up prism lens assembly 11 introduced in FIG. 1, showing the pop up prism lens assembly 11 in "ready" and "closed" positions, respectively. The following description of the pop up prism lens assembly 11 will be in reference to all of FIGS. 1 through 3, since it will be desirable to view some aspects of the invention from all three of these views.

As can be seen in the view of FIG. 1, the pop up prism lens assembly 11 has a first (distal) lens assembly 14, a field lens 15, a sensor 16 and a second (proximal) lens assembly 18. The first lens assembly 14 and the second lens assembly 18 are, respectively, the front and rear elements of a telephoto lens as will be discussed in more detail hereinafter. The sensor 16 is the electronic sensor array of the digital pop up prism camera 10. The field lens 15 is the lens closest to the sensor 16 which projects an image from the pop up prism lens assembly 11 onto the sensor 16. One skilled in the art will recognize that the sensor 16 can be of essentially any type now known or yet to be developed. In the example of FIG. 1, the sensor 16 is a CCD image sensor. It is within the scope of the invention that the sensor 16 could also be a photographic film, or the like.

The first lens assembly 14 and the second lens assembly 18 move along at least one (two in this present example) of guide rods 19 under the control of a cam tube 20, as will be discussed in greater detail hereinafter. A prism assembly 21 is also movably affixed along the guide rods 19. It should be noted that mechanical apparatus for rotating the cam tube 20 is conventional in nature and is omitted from the view of FIG. 1 for the sake of clarity. It is anticipated that the cam tube 20 can be rotated either manually (e.g., a thumb-wheel), or else by an electric motor controlled by an on/off switch and/or by a "zoom" button on the camera housing 12. In the example of FIGS. 1 through 3, the cam tube 20 is powered through a gear assembly by a high speed electric motor (not shown), although it is within the scope of the invention that the cam tube 20 could be powered by a stepper motor, or essentially any other type of motive apparatus that might be adapted to the purpose.

The first lens assembly 14 is guided along an inner guide rod 19a and an outer guide rod 19b by a first guide assembly 22. A first inner guide bushing 24 of the first guide assembly 22 slidably fits over the inner guide rod 19a, and a first outer guide bushing 26 of the first guide assembly 22 slidably fits over the outer guide rod 19b. A first cam follower 28 fits into and follows a first cam groove 30 in the cam tube 20.

The second lens assembly 18 is guided along the inner guide rod 19a and the outer guide rod 19b by a second guide assembly 32. A second inner guide bushing 34 of the second guide assembly 32 slidably fits over the inner guide rod 19a, and a second outer guide bushing 36 of the second guide assembly 32 slidably fits over the outer guide rod 19b. A second cam follower 38 fits into and follows a second cam groove 40 in the cam tube 20.

The prism assembly 21 is guided along the inner guide rod 19a and the outer guide rod 19b by a third guide assembly 42. A third inner guide bushing 44 of the third guide assembly 42 slidably fits over the inner guide rod 19a, and a third outer guide bushing 46 of the third guide assembly 42 slidably fits over the outer guide rod 19b. A third cam follower 48 fits into and follows a third cam groove 50 in the cam tube 20.

As can be appreciated in light of the foregoing description of the pop up prism camera 10, it can be seen that the first lens assembly 14 selectively moves toward or away from the sensor 16 as the cam tube 20 is rotated, and further that the second lens assembly 18 also selectively moves toward or away from the sensor 16 as the cam tube 20 is rotated. As can also be seen by comparing the views of FIGS. 1 through 3, the third cam groove 50 has an angled portion 52 (FIG. 1) and a non-angled portion 54 (FIGS. 2 and 3). Accordingly, as the third cam follower 48 moves along angled portion 52 of the third cam groove 50 the prism assembly 21 will move inward and outward as described above. However, when the third cam follower 48 reaches the non-angled portion 54 of the third cam groove 50 then, even though the cam tube 20 may continue to rotate, the prism assembly 21 will remain relatively fixed in relationship to the camera housing 12. Note that a small portion of the angled portion 52 of the third cam groove, with the third cam follower 48 therein, can also be seen in the view of FIG. 3.

As can be seen in the view of FIG. 1, the second cam groove 40 also has a non-angled portion 54a such that the second lens assembly 18 will stop advancing along the rear movement arrow 62 even as the cam tube 20 continues to rotate when the second cam follower 38 is in that portion of the second cam groove 40. This will tend to prevent the second lens assembly 18 from coming to an abrupt halt as the second lens assembly 18 reaches what would otherwise be the end of the second cam groove 40.

Similarly, as the cam tube 20 is rotated, the first lens assembly 14 will selectively move into an operational position (as depicted in FIGS. 1 and 2) with the prism assembly 21. Also, as the cam tube 20 continues to rotate, the second lens assembly 18 will selectively move toward or away from first lens assembly 14 to accomplish the zoom function. In the example of the invention presently described, the movement of the second lens assembly 18 relative to the first lens assembly 14 will accomplish approximately a fourfold change in the magnification power of the pop up prism lens assembly 11, otherwise known as a 4× zoom function. One skilled in the art will recognize that coordinated movement of both the first lens assembly and the second lens assembly 18 relative to both each other and to the fixed field lens 15 will accomplish the zoom function while keeping the image focused on the sensor 16. As can also be seen by a comparison of the views of FIGS. 1 through 3, in this embodiment of the invention, the first cam groove is 30 more greatly elongated along the length of the cam tube 20 than is the second cam groove 40 such that, as the cam tube 20 is rotated, the first lens assembly 14 will move a greater distance than will the second lens assembly 18.

Focus of the pop up prism lens assembly 11 can optionally be accomplished by rotating a focus ring 56 (FIG. 1). The focus ring 56 is not significantly different from similar mechanisms in prior art devices. The focus ring 56 can, optionally, be moved manually (via an optional manual adjustment mechanism, not shown) or else the focus ring 56 can be rotated by an electric motor controlled by a focus control on the exterior of the camera housing 12.

Also shown in the view of FIG. 1 is an optical path 58 along which light travels through the prism assembly 21, through the first lens assembly 14, through the second lens assembly 18, through the field lens 15 and into the sensor 16. As previously described, movement of the first lens assembly 14 will be inward and outward as indicated by a front movement arrow 60, and movement of the second lens assembly 18 will be inward and outward as indicated by a rear movement arrow 62.

Figure 4:
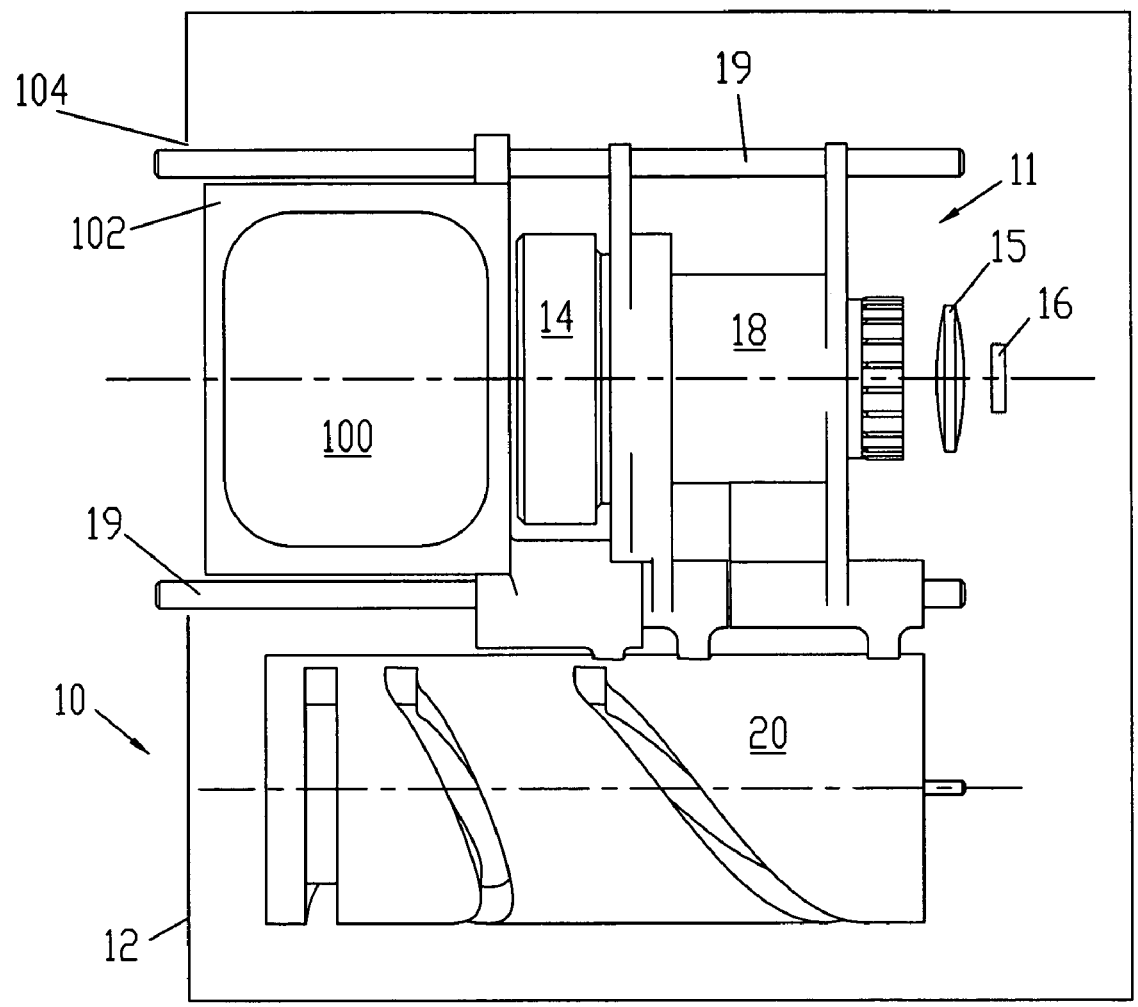
FIG. 4 is a diagrammatic cross-sectional side elevation view of a camera, similar to the view of FIG. 1 except that the device is shown in a closed position.

As can be appreciated in light of the above discussion, the pop up prism camera 10 is depicted in the view of FIG. 1 in an opened (ready) position, with the prism assembly 21 generally outside the limits of the camera housing 12. FIG. 4 is a diagrammatic cross sectional side elevational view of the pop up prism camera 10, similar to the view of FIG. 1, except that the camera 10 is depicted in the view of FIG. 4 in a stored (closed) position with the prism assembly 21 generally inside the limits of the camera housing 12, and further with the first lens assembly 14 and the second lens assembly 18 drawn relatively near to each other.

In the view of FIG. 3 it can be seen that the prism assembly 21 has a prism 100 which is protected by prism housing 102. When the prism assembly 21 is withdrawn into the camera housing 12 (FIG. 4) then the prism housing 102 generally occludes an opening 104 in the camera housing 12 through which the prism assembly 21 can be moved to project outside the camera housing 12, thereby protecting the prism 100 and further preventing foreign objects from entering into the camera housing 12.

Referring now to the view of FIG. 2, it can be seen that, in the embodiment of the invention described, the cam tube 20 has a first operational portion 110 and a second operational portion 112, each of which, in this presently described embodiment, occupy approximately half of the circumference of the cam tube 20. Of course, the slope of the cam grooves 30, 40 and 50 could be made greater, such that less than a full 360 degree rotation of the cam tube 20 would be required to move through the entire operational range thereof. In such an embodiment, each of the first operational portion 110 and the second operational portion 112 would take up generally less than half of the circumference of the cam tube 30. Similarly, the slope of the cam grooves 30, 40 and 50 could be made such that more than one full rotation of the cam tube 20 would be required to move the pop up prism lens assembly 11 through its entire operational range. In such an example, the first operational portion 110 and the second operational portion 112 would overlap about the circumference of the cam tube. These are but some of the possible variations in the shape of the cam tube 20 and the cam grooves 30, 40 and 50 thereon, which might be employed to adapt the invention to a particular application. In any of these configurations, it is an aspect of the present invention that there will be a portion of the cam tube 20 such that, when the cam followers 28, 38 and 48 follow therein, then the elements of the pop up prism lens assembly will be brought into the "ready" position, as described above. Further, there will be a portion of the cam tube 20 such that, when the cam followers 28, 38 and 48 follow there, then the prism assembly 21 will remain in the "ready" position while other elements of the pop up prism lens assembly 11 continue to move, as required, to change the lens configuration (such as to change the magnification factor, as described herein).

In the view of FIG. 3 it can also be seen that, to save space and weight, the cam tube 20 can be made such that it has a hollow center 120. In such an application, the hollow center 120 can optionally be used to house a battery 122, a flash capacitor (not shown) or other camera components, as required.

Various modifications may be made to the invention without altering its value or scope. For example, the sizes, shapes and quantities of components shown and described in relation to the examples discussed herein could each or all be varied according the needs or convenience of a particular application.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive pop up prism camera 10 and associated pop up prism lens assembly 11 is intended to be widely used for a variety of camera applications. A particular use is for mid-priced digital cameras wherein compact size, durability, picture quality, and economy are all important factors.

According to the presently contemplated embodiments of the present invention, the cam tube 20 does take up a significant amount of space. However, that space is fully utilized in that additional components, such as a battery, a capacitor for flash applications or the like, can optionally be fitted within the cam tube 20.

The inventive apparatus as described herein has the advantage that it does not introduce parallax into the optical path during the zooming of the pop up prism lens assembly 11. Further, the apparatus described contributes to the creation of a small camera in that the length and overall size is minimal, and further contributes to the creation of an inexpensive and reliable camera in that the quantity of moving components is minimized.

Since the pop up prism lens assemblies 11 of the present invention may be readily produced and integrated with existing camera sensor and digital camera image capture and storage systems, and since the advantages as described herein are provided, it is expected that it will be readily accepted in the industry. For these and other reasons, it is expected that the utility and industrial applicability of the invention will be both significant in scope and long-lasting in duration.

I claim:

1. A camera, comprising:
   a sensor array;
   a prism affixed within the camera such that the prism moves selectively into and out of the camera such that the prism directs an optical path toward the sensor array when the prism is moved out of the camera; and
   a proximal portion of a lens assembly that can be selectively moved toward and away from the sensor array; and wherein
   the prism is caused to move by a generally drum shaped cam; and
   movement of the prism follows a generally spiral feature on the cam.

2. The camera of claim 1, wherein:
   at least a portion of the optical path is generally perpendicular to the sensor array.

3. The camera of claim 1, and further including:
   a prism housing that at least partially encloses the prism.

4. The camera of claim 1, wherein:
   movement of the proximal portion of the lens assembly changes the magnification of the lens assembly.

5. The camera of claim 1, wherein:
   both the proximal portion of the lens assembly and a distal portion of the lens assembly are caused to move by the cam.

6. The camera of claim 5, wherein:
   movement of the proximal portion and the distal portion of the lens assembly follow the generally spiral feature on the cam.

7. The camera of claim 6, wherein;
   the generally spiral feature includes at least one groove; and
   at least one follower projection is affixed to the lens assembly to cause movement or at least one portion of the lens assembly as the follower follows the generally spiral feature.

8. The camera of claim 5, wherein:
   the generally spiral feature hats a non-advancing portion such that one of the proximal portion of the lens or the distal portion of the lens will cease to advance while the other continues to advance as the cam is rotated.

9. The camera of claim 1, wherein;
   the generally spiral feature includes at least one groove; and
   at least one follower projection is affixed to the prism to cause movement of the prism as the follower follows the generally spiral feature.

10. The camera of claim 1, wherein:
    at least a portion of the generally spiral feature has a non-advancing portion such that the prism will cease to advance when the prism reaches the non-advancing portion even as the cam continues to rotate.

11. A camera, comprising:
    an imaging medium;
    a lens apparatus for directing an optical path onto the imaging medium; and
    a prism for directing the optical path onto the lens apparatus; and
    a motive apparatus for moving the prism and further moving at least a portion of the lens apparatus; and wherein
    the motive apparatus includes a cam;
    the cam has at least two contoured features;
    movement of the prism is controlled by a first one of the contoured features; and
    movement of a least a portion of the lens apparatus is controlled by a second one of the contoured features.

12. The camera of claim 11, wherein:
    moving at least a portion of the lens apparatus causes a change in the magnification factor of the lens apparatus.

13. The camera of claim 11, wherein the motive apparatus includes:
    a drum cam; and
    a follower for following a feature of the drum cam.

14. The camera of claim 13, wherein:
    the feature is a groove in the cam; and
    a cam follower fits within the groove such that the cam follower moves generally along at least a portion of the length of the cam as the cam is rotated.

15. The camera of claim 11, wherein:
    the imaging medium is a digital sensor.

16. The camera of claim 11, wherein:
    the contoured feature includes a groove in the cam.

17. The camera of claim 11, wherein:
    the cam is a drum type cam.

18. The camera of claim 11, wherein:
    the cam has a first portion such that rotation of the cam through the first portion causes the prism to come into a ready position; and
    the cam has a second portion such that rotation of the cam through the second portion causes the prism to remain generally stationary while at least a portion of the lens apparatus moves.

19. The camera of claim 18, wherein:
    the earn is a drum type cam; and
    said first portion and said second portion each include at least a portion of the circumference of the drum type cam.

20. The camera of claim 18, wherein:
    the cam is a drum type cam; and
    said first portion is located generally about a first half of the circumference of the cam; and
    said second portion is located generally about a second half of the circumference of the cam.

21. The camera of claim 11, wherein:
    the first contoured feature includes a non-advancing portion such that the prism remains generally stationary while a earn follower affixed to the prism is within the non-advancing portion.

22. The camera of claim 21, wherein:
the second contoured feature further includes a second non-advancing portion, such that at least a portion of the lens apparatus remains generally stationary while a cam follower affixed to that portion of the lens apparatus is within the second non-advancing portion.

23. A camera, comprising;
a sensor array; and
a prism affixed within the camera such that the prism is caused to move by a cam selectively into and out of the camera such that the prism directs an optical path toward the sensor array when the prism is moved out of the camera; and wherein the cam is generally drum shaped; and
movement of the prism follows a generally spiral feature on the cam.

24. The camera of claim 23, wherein;
the generally spiral feature includes at least one groove; and
at least one follower projection is affixed to the prism to cause movement of the prism as the follower follows the generally spiral feature.

25. The camera of claim 23, wherein:
at least a portion of the generally spiral feature has a non-advancing portion such that the prism will cease to advance when the prism reaches the non-advancing portion even as the cam continues to rotate.

26. A camera, comprising:
an imaging medium;
a lens apparatus for directing an optical path onto the imaging medium; and
a prism for directing the optical path onto the lens apparatus; and
a motive apparatus for moving the prism, the motive apparatus including a cam; and wherein
the cam has at least two contoured features;
movement of the prism is controlled by a first one of the contoured features; and
movement of at least a portion of the lens apparatus is controlled by a second one of the contoured features.

27. The camera of claim 26, wherein:
the motive apparatus further moves at least a portion of the lens apparatus.

28. The camera of claim 27, wherein:
moving at least a portion of the lens apparatus causes a change in the magnification factor of the lens apparatus.

29. The camera of claim 26, wherein:
the motive apparatus includes a drum cam and a follower for following a feature of the drum cam.

30. The camera of claim 29, wherein:
the feature is a groove in the drum cam; and
a cam follower fits within the groove such that the earn follower moves generally along at least a portion of the length of the cam as the cam is rotated.

31. The camera of claim 26, wherein:
the imaging medium is a digital sensor.

32. The camera of claim 26, wherein:
the contoured feature includes a groove in the cam.

33. The camera of claim 26, wherein:
the cam is a drum type cam.

34. The camera of claim 26, wherein:
the cam has a first portion such that rotation of the cam through the first portion causes the prism to come into a ready position; and
the cam has a second portion such that rotation of the cam through the second portion causes the prism to remain generally stationary while at least a portion of the lens apparatus moves.

35. The camera of claim 34, wherein:
the cam is a drum type cam; and
said first portion and said second portion each include at least a portion of the circumference of the drum type cam.

36. The camera of claim 34, wherein:
the cam is a drum type cam; and
said first portion is located generally about a first half of the circumference of the cam; and
said second portion is located generally about a second half of the circumference of the cam.

37. The camera of claim 26, wherein:
the first contoured, feature includes a non-advancing portion such tat the prism remains generally stationary while a cam follower affixed to the prism is within the non-advancing portion.

38. The camera of claim 37, wherein:
the second contoured feature further includes a second non-advancing portion, such that at least a portion of the lens apparatus remains generally stationary while a cam follower affixed to that portion of the lens apparatus is within the second non-advancing portion.

* * * * *